R. B. McCONNEY.
AUTOMATICALLY OPERATING HYDROPNEUMATIC WATER LIFTING APPARATUS.
APPLICATION FILED APR. 26, 1921.
1,421,513.  Patented July 4, 1922.
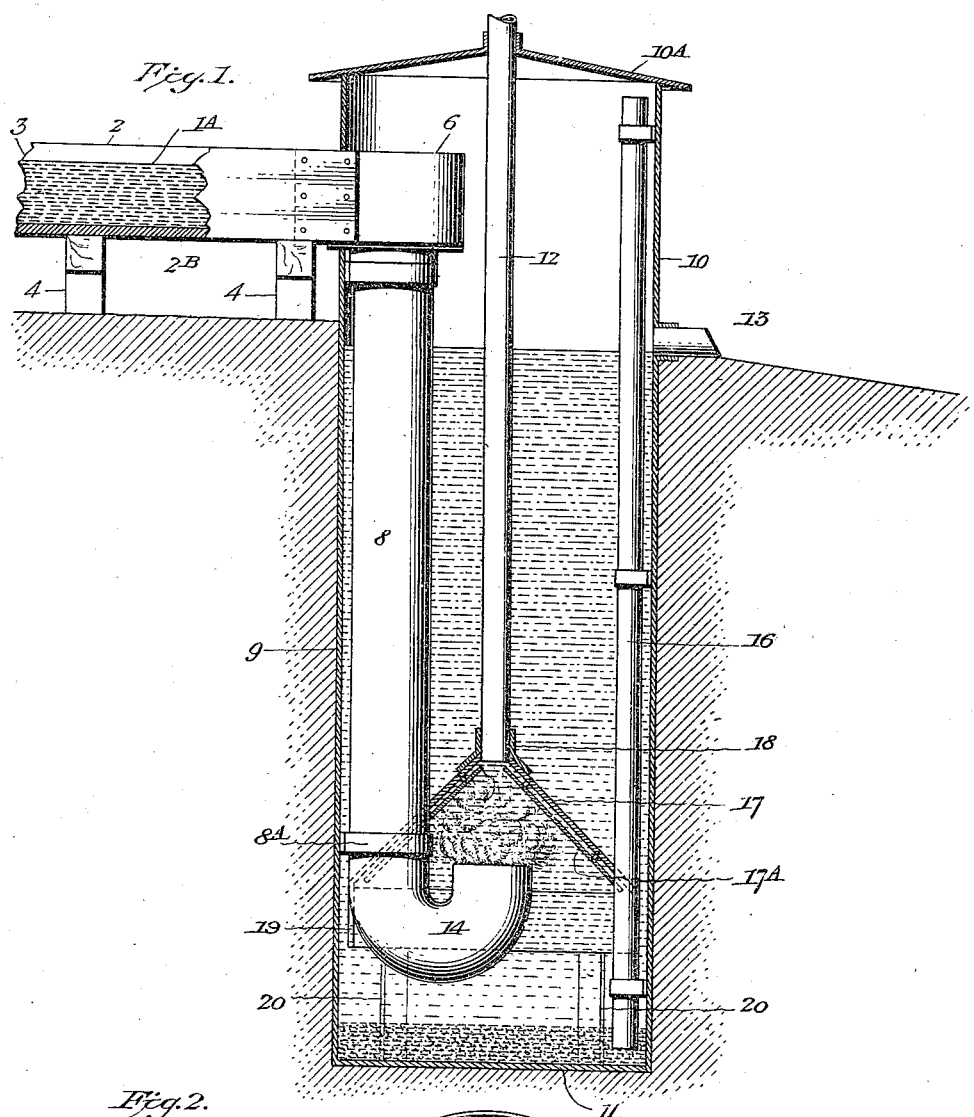
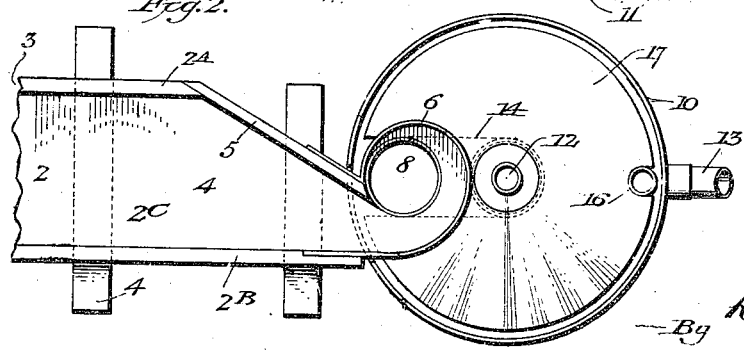
Inventor:
Robert B. McConney
By H. S. Bailey, Attorney

UNITED STATES PATENT OFFICE.

ROBERT B. McCONNEY, OF DENVER, COLORADO, ASSIGNOR OF SIXTEEN AND TWO-THIRDS ONE-HUNDREDTHS TO DE WITT CLINTON GATES, OF DENVER, COLORADO.

AUTOMATICALLY-OPERATING HYDROPNEUMATIC WATER-LIFTING APPARATUS.

1,421,513. Specification of Letters Patent. Patented July 4, 1922.

Application filed April 26, 1921. Serial No. 464,513.

*To all whom it may concern:*

Be it known that I, ROBERT B. McCONNEY, a citizen of the United States of America, residing at the city and county of Denver and State of Colorado, have invented a new and useful Automatically-Operating Hydropneumatic Water-Lifting Apparatus, of which the following is a specification.

My invention relates to a new automatically operated hydro-pneumatic water lifting apparatus for irrigation and other purposes by the use of the power from a low fall in a running stream.

And the objects of my invention are:

First: To provide a water lifting apparatus that is adapted to raise water by the combined action of water and entrained air.

Second: To provide a water lifting apparatus that is provided with a means for commingling water and air, then separating said entrained air for the purpose of raising a portion of the water above its source of supply.

Third: To provide an automatically operating water lifting apparatus in which a current of water is caused to entrain or commingle with such a constantly inflowing stream or volume or amount of air as said current of water will entrain; said air afterward being released to raise a part of said water above its source of supply a predetermined distance, and that is provided with any means for causing the entrainment of air in said current of water.

I attain these objects by the mechanism illustrated in the accompanying drawings, in which:

Figure 1 is a vertical sectional view through the improved water lifting apparatus.

Figure 2 is a plan view of the same.

Similar letters of reference refer to the several parts throughout the several views.

Referring to the drawings:

The numeral 2 designates a water conveying irrigation flume that receives a supply of water $1^A$, from a ditch or river. The flume 2 may be of any width and depth, and at any point in the length of the ditch or river at which it is desired to raise water above the level of the ditch or river, I set the water inlet end portion 3, of the flume on supports 4, and I insert or form a current-deflecting side board or partition member 5, which is preferably fixed at one end to one of the straight sides $2^A$, of the flume, and projects at an inward angle towards its opposite side $2^B$, of the flume, for a predetermined distance, and it may be made of any predetermined length, but is of the same height or higher, if desired, than the sides of the flume. If desired, this current deflecting partition can be pivotally secured to one side of the flume so that its outer end may be made swingingly adjustable so that the width of the flume and its current may be varied in width as much or as little as desired, to secure the best result from the volume and flowing speed of the current of water in the ditch or river or in the flume. This inwardly projecting current-deflecting side member 5, of the flume forms a part of the extreme outer end portion of the flume, which terminates in a curved wall member 6, which may be made of any suitable material, but which preferably consists of a metal plate that is secured to the inside of the opposite side $2^B$ of the flume 2, from the current deflecting side board 5, and it curves from the end of the side $2^B$ in a curve that may be a true curve or an involute curve, preferably an involute form of curve, which is formed to extend partially around the upper end of a vertical, or of a vertically inclined or upright pipe 8, to its circumferential surface, at a point adjacent to the outer terminal end of the current deflecting sideboard 5, which it overlaps and is rigidly or adjustably secured thereto, the terminal end of which is curved on its inner end side to fit the curve and to stand above the inner end of the pipe 8, to the full height of the flume 2, and the pipe 8 is positioned directly at and partially behind the end of the current deflector 5; the curved wall plate 6 may start and project in the radially progressive line of a true involute curve or of any practical form of a curve that will direct the current of water that is narrowed up and contracted in width by the current deflector 5, to flow in a sweeping circular path against the inner wall of the curved plate 6, which guides it directly into the top of the pipe 8, and imparts to it a swirling movement that narrows it progressively in a convergingly tapering form into a circular whirlpool over the top entrance of the pipe 8, that causes the swirling water to draw into the top of the pipe by suction, air to such an amount or volume as to form a continuously inflowing column or stream of air that mixes with the water and is carried down into and through the pipe 8, and discharges from it and lifts a portion of the water that flows into and through the pipe 8, to a higher level than the current of water in the ditch, river or flume, as will be presently described.

The vertical pipe 8, I term the water and air power pipe, and it is secured at its top portion to the bottom of the flume with its open top end even or flush with the floor $2^C$, of the flume, and its lower end portion is secured to the casing by a strap $8^A$, and this pipe extends down into a well hole 9, close to one side of the casing. This well 9, may consist of a hole dug in the ground to a depth proportionate to the volume of the water in the flume and the height it is desired to raise a part of it, and the well should be either cemented on the inside and bottom or lined with a concrete, stone or wood inner wall and floor to prevent water from seeping into it. I preferably, however, line it with a piece of metal well casing 10, the lower end of which is closed by a bottom plate portion 11; this well casing preferably extends up above the flume a few feet, and its upper end is preferably covered by a cap $10^A$. One side of the well casing 10 is cut away to fit around the terminal end portion of the flume. A water discharging pipe 12, extends down into the well casing, and preferably extends through and above the cap of the casing.

The flume 2 is positioned at a few feet above the tail race level, Figure 1 representing it at about three feet above that level, and at this level a discharge spout 13 is secured to the well casing, preferably on the opposite side of it from the vertical pipe 8.

The lower end of the pipe 8 is provided with a return bend portion 14, which may be formed on the end of the pipe itself, if desired, but which preferably consists of a return pipe elbow, as shown in Figure 1, which forms the bend 14, and it is arranged to project from the lower end of the pipe 8, into the central portion of the well casing 10, and the lower end of the pipe 8, with its elbow, is extended down into the casing from the water discharging end of the flume close to its bottom casing plate, and can be extended to rest on the bottom plate if desired. I preferably, however, position its lower end at a few inches above the bottom plate in order to form a sump space at the bottom of the casing for the sand and mud that may be in the water flowing through the flume into the vertical pipe 8, to settle in, and I provide the opposite side of the casing 10, from the air and water power pipe, with a hand operating sand pump 16, that is secured to its inner side, by which the sand and mud that accumulates in the bottom of the casing can be removed from time to time.

Within the well casing 10, at its bottom portion I place a circular conical form of hood 17, that surrounds centrally the turned-up outlet end of the elbow of the vertical pipe 8, the inside apex 18 of which is positioned a predetermined distance above the top of the elbow. This conical hood is made proportionately smaller in diameter than the casing 10, to permit the escape of the surplus or power water at a low velocity between the skirt 19, of hood 17, and the casing 10; and while I may secure it to the inside wall of the casing in its operative position, I preferably provide it with legs 20, which extend from it and rest on the bottom plate of the casing; consequently it can be easily and quickly removed from the casing, as it is cut away to fit close to but loosely around the vertical pipe 8.

To the apex 18, of the conical hood 17, I connect the lower end of the water discharging pipe 12. All of the water in the flume flows into the top of the pipe 8, together with such air as is drawn into the pipe with it, and this commingled water and air discharges from the outlet end of the upward turned and discharging end of elbow 14, of the vertical pipe 8, against the surrounding sides and the apex portion of the hood, and as the area of the hood is proportionately much larger than that of the pipe 8, the velocity of the power water is proportionately lessened permitting the entrained air to rise toward the apex 18 of the hood where it enters the water filled pipe 12, decreasing the density of the water column therein and causing the water to raise above the static level a distance equivalent to the volume of air contained in the pipe 12, and as air is constantly supplied, together with a surplus of water, a constant flow is set up in pipe 12, from which it is discharged into a ditch, flume or reservoir and is used for irrigation or other purposes at a level considerably above the level of the intake flume, ditch or river.

As the smaller bubbles of air discharged from elbow 14 tend to be swept away by the surplus water, I provide a protector plate $17^A$, a short distance inside the hood 17, so positioned that the smaller bubbles that rise inside the skirt 19, of the hood 17, or those bubbles that may be swept downwardly along the inside of the hood 17, may be protected from the current, permitting them to flow between the inner surface of the hood 17 and the protector plate $17^A$, and thence enter the pipe 12 with the larger bubbles.

The greater portion of the water that discharges from the end of the power pipe flows out under the lower edges of the hood and up past them and fills the well casing full at all times up to the level of the discharge spout 13, through which the water in the casing flows from this level and can be discharged directly into a ditch or lateral and can be used for irrigation, or it may be conveyed by an extension from the discharging spout back into the main ditch or river from which the supply of water is obtained.

Figure 1 represents a proportional size drawing of my apparatus, in which the well casing is four feet in diameter and about twenty-two feet long, the vertical pipe 8 is twelve inches in diameter, and ten feet long, and the water discharging pipe 12 is four inches in diameter and twenty feet long, and water is lifted in a continuous stream ten feet above the ditch or river from which the water is taken.

My invention can, however, be used to raise water for many other purposes than for irrigation, such, for instance, as domestic water supply, water supply for ore treating mills, locomotive water supply and other industrial uses.

The operation of my hydro-pneumatic water lifting apparatus is very simple, and automatically continuous, and is in general as follows:

The headgate and flume are constructed to carry the volume of water necessary to produce the power required for the elevating operation. The power pipe 8 is proportioned to carry the power water and entrained air at such velocity that the entrained air is carried through the power pipe and cannot rise against the current. The fall from flume to discharge 13 is proportioned to cause the proper velocity of flow in the power pipe and to cause the maximum entrainment of air through suction at the top of power pipe 8. The delivery pipe 12 is proportioned to deliver the elevated water when mingled with the volume of air which is delivered through the power pipe.

The central pipe is the pipe through which the water is elevated, and the pit or well which is filled with water to the overflow level furnishes the operating head or pressure. When in operation, the water in the well or pit is at its normal density, while the water in the central pipe is mixed with a large volume of air by which its density is lessened. This causes an unbalancing of the pressure of the water in the central pipe as compared to that in the well and the mixed water and air in the central pipe will rise to a height inversely proportionable to its density. The air supply used in the central pipe is secured through the action of the power water flowing downward through the large power pipe. At the upper end of the power pipe I cause the water to form a whirlpool, which, with the rapid flow downward through the pipe causes a large volume of air to be entrained and carried downward and to be discharged with the power water at the end of the elbow. The vertical distance from the inflow at the top of the power pipe to the level of the discharge is proportioned to cause such velocity of flow in the lower pipe as to entrain and carry downward the largest possible proportion of air.

Above the discharge of the power pipe I place a hood which I make several times larger in diameter than the power pipe to reduce the velocity of the surplus or power water so that practically all the air swept down said pipe will rise to the apex of the hood while the surplus or power water slowly moves downward and passes under the skirt, thence upward between skirt and curb toward the overflow.

The separated air enters the central pipe decreasing the density of the column in said pipe, causing the water to rise, as described above. As an example, if the water in the pit stood at a level of ten feet above the apex of the hood, and one volume of air were mixed with one volume of water, making a density in the central pipe of one half that of solid water, the surface of the water in said pipe would rise to a point twenty feet above the apex of the cone.

I place the power pipe elbow in such position that it discharges the power water and its contained air directly toward the apex of the hood in order that the inertia of the flowing water aids the efficiency of delivery of the central pipe, and to secure a uniform flow of the surplus or power water in all directions, from the discharge point of elbow toward the skirt at the bottom of the hood. The larger bubbles of air will enter the central pipe directly from elbow, while the smaller bubbles will not separate from the power water until it approaches the skirt.

I therefore place a protector plate a short distance inside the hood in order that any small bubbles that are swept nearly to the skirt may rise and be protected by the protector plate from being swept away by the current of power water flowing from the elbow toward the skirt.

While I have described a whirlpool at the top of the power pipe as a method of causing air to be mingled with and carried downward by the power water, and while I have not shown any means, except the natural suction drawing property of swirling water entering the top of the power pipe, my invention, however, contemplates broadly the use of any means for promoting and assisting and of even forcing air into the top of the pipe into commingling engagement with the water entering therein from the curve ended wall of the flume.

My invention provides a very simple, automatically operating water lifting apparatus that is free from expensive machine parts, and that is thoroughly practical and not liable to get out of order, and while I have illustrated and described the preferred construction and arrangement of it, I do not wish to be limited to it, as changes may be made without departing from the spirit of my invention.

Having described my invention, what I claim as new and desire to secure by Letters Patent, is:

1. A hydro-pneumatic water lift, comprising a water conduit, means connected therewith for commingling air and water in said conduit, and means at the end of said conduit whereby the air raises a portion of said water; a hood in said casing in which said commingled air and water discharges and a protector plate inside of said hood.

2. A hydro-pneumatic water lift, comprising a water conduit, means connected therewith for commingling air and water in said conduit, and means at the end of said conduit whereby the air raises a portion of said water; a hood in said casing in which said commingled air and water discharges, and a protector plate inside of said hood; said protector plate consisting of a conical member positioned at a sufficient distance from the inside surface of said hood to form an air passageway between it and the inside surface of said hood.

3. A hydro-pneumatic water lift, compressing means including a member for guiding a flowing current of water into a swirling whirlpool shape over the entrance of and into an upright water conveying member, said water guiding member comprising a flume provided with a current deflector, and a curved wall at the end of said flume and its deflector, arranged to guide said current into the form and shape of a swirling whirlpool.

4. A hydro-pneumatic water lift, compressing means including a member for guiding a flowing current of water into a swirling whirlpool shape over the entrance of and into an upright water conveying member, said water guiding member comprising a flume provided with a current deflector, and a curved wall at the end of said flume and its deflector, arranged to guide said current into the form and shape of a swirling whirlpool, said upright water conveying member comprising a pipe connected to the bottom of said flume at the end of said curved wall and said current deflector.

5. A hydro-pneumatic water lift, compressing means including a member for guiding a flowing current of water into a swirling whirlpool shape over the entrance of and into an upright water conveying member, said water guiding member comprising a flume provided with a current deflector, and a curved wall at the end of said flume and its deflector, arranged to guide said current into the form and shape of a swirling whirlpool, said upright water conveying member comprising a pipe connected to the bottom of said flume at the end of said curved wall and said current deflector, said curved wall and the end of said current deflector being arranged to guide the water in a swirling path into the top of said pipe.

6. A hydro-pneumatic water lift, compressing means including a member for guiding a flowing current of water into a swirling whirlpool shape over the entrance of and into an upright water conveying member, said water guiding member comprising a flume provided with a current deflector, and a curved wall at the end of said flume and its deflector, arranged to guide said current into the form and shape of a swirling whirlpool, said upright water conveying member comprising a pipe connected to the bottom of said flume at the end of said curved wall and said current deflector, said curved wall and the end of said current deflector being arranged to guide the water in a swirling path into the top of said pipe, and a water holding well hole below said flume, into which said pipe extends, and means including a hood into which said pipe discharges its swirling water with the air it draws into said pipe, and a pipe for conveying a part of the swirling water discharged out of said hood above said flume.

7. A hydro-pneumatic water lift, compressing means including a member for guiding a flowing current of water into a swirling whirlpool shape over the entrance of and into an upright water conveying member, said water guiding member comprising a flume provided with a current deflector, and a curved wall at the end of said flume and its deflector, arranged to guide said current into the form and shape of a swirling whirlpool, said upright water conveying member comprising a pipe connected to the bottom of said flume at the end of said curved wall and said current deflector, said curved wall and the end of said current deflector, being arranged to guide the water in a swirling path into the top of said pipe, and a water holding well hole below said flume, into which said pipe extends, and means including a hood into which said pipe discharges its swirling water with the air it draws into said pipe, and a pipe for conveying a part of the swirling water discharged out of said hood above said flume, an upright member comprising a water conveying conduit adapted at its upper end to draw by suction, air into it as the water flows into it from said curved wall, means for compresssing the air at the lower end of said conduit and for discharging it above said flume.

8. A hydro-pneumatic water lifting apparatus, comprising means including a flume provided with a water swirling portion, a water holding well hole below the water swirling portion of said flume, and a pipe secured to said flume at the center of its water swirling portion, and extending down into said well, and arranged to receive the swirling water from said flume, a hood in said well surrounding the lower end of said swirling water receiving pipe, a water discharging pipe extending from said hood above said flume a predetermined distance, and a discharge spout in said well above said hood, and a conical member positioned within the hood to form a passageway between it and the inside surface of said hood.

9. A hydro-pneumatic water lifting apparatus, comprising a flume connected to and provided with a running stream of water, a water holding well hole at and below the outer end of said flume, a water conveyor secured to the bottom of the outer end of said flume and depending into said well hole, means for swirling the running water in said flume over and around the entrance to said pipe in a manner to draw, by suction, air down into said pipe in commingling engagement with the water flowing into it from said flume, means for compressing said air in said well at the lower end of said pipe and for raising and discharging a portion of it above said flume, and an air outlet for the water flowing into said well below said flume and above said air compressing means, and a conical member within said hood arranged to form an air passageway between it and the inside surface of said hood.

10. A hydro-pneumatic water lifting apparatus, comprising a flume connected to and provided with a running stream of water, a water holding well hole at and below the outer end of said flume, a water conveyor secured to the bottom of the outer end of said flume and depending into said well hole, means for swirling the running water in said flume over and around the entrance to said pipe in a manner to draw, by suction, air down into said pipe in commingling engagement with the water flowing into it from said flume, means for compressing said air in said well at the lower end of said pipe and for raising and discharging a portion of it above said flume, and an air outlet for the water flowing into said well below said flume and above said air compressing means, said water swirling means comprising a current deflector and a curved wall at the end of said flume arranged to guide and cause the water flowing through said flume to move in a swirling curve around the entrance to said pipe.

11. A hydro-pneumatic water lifting apparatus, comprising a flume connected to and provided with a running stream of water, a water holding well hole at and below the outer end of said flume, a water conveyor secured to the bottom of the outer end of said flume and depending into said well hole, means for swirling the running water in said flume over and around the entrance to said pipe in a manner to draw, by suction, air down into said pipe in commingling engagement with the water flowing into it from said flume, means for compressing said air in said well at the lower end of said pipe and for raising and discharging a portion of it above said flume, and an air outlet for the water flowing into said well below said flume and above said air compressing means, said water swirling means comprising a current deflector and a curved wall at the end of said flume arranged to guide and cause the water flowing through said flume to move in a swirling curve around the entrance to said pipe, said air compressing means comprising a hood member covering the outlet end of said air and water discharging pipe, and a water discharging pipe secured at one end to said hood and extending above the level of the water in said flume a predetermined distance.

In testimony whereof I affix my signature in presence of two witnesses.

ROBERT B. McCONNEY.

Witnesses:
G. SARGENT ELLIOTT,
EMILY ROBERTS.